US008817613B2

(12) United States Patent
Nakajima (10) Patent No.: US 8,817,613 B2
(45) Date of Patent: Aug. 26, 2014

(54) RADIO TRANSMISSION APPARATUS AND MAC FRAME TRANSMISSION METHOD (75) Inventor: Hiroaki Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 161 days.

(21) Appl. No.: 13/262,953

(22) PCT Filed: Apr. 27, 2010

(86) PCT No.: PCT/JP2010/003006
§ 371 (c)(1),
(2), (4) Date: Oct. 5, 2011

(87) PCT Pub. No.: WO2010/125803
PCT Pub. Date: Nov. 4, 2010

(65) Prior Publication Data
US 2013/0215741 A1 Aug. 22, 2013

(30) Foreign Application Priority Data

May 1, 2009 (JP) ................. P2009-112066

(51) Int. Cl.
H04L 12/26 (2006.01)
(52) U.S. Cl.
USPC .......... 370/230; 370/229; 370/230.1; 370/231
(58) Field of Classification Search
USPC ................. 370/352, 252, 231, 217, 230
See application file for complete search history.

(56) References Cited

U.S. PATENT DOCUMENTS 6,724,725 B1 * 4/2004 Dreyer et al. ................. 370/231
2004/0081090 A1 4/2004 Hara et al.
2005/0174943 A1 8/2005 Wang
2008/0259785 A1 * 10/2008 Truong et al. ................. 370/217
2009/0124211 A1 * 5/2009 Itoh et al. ..................... 455/69
2010/0246512 A1 * 9/2010 Kawamura et al. ........... 370/329
2011/0142022 A1 6/2011 Kubo et al.

FOREIGN PATENT DOCUMENTS

| CN | 101035050 A | 9/2007 |
| JP | 57-159148 A | 10/1982 |
| JP | 2004104427 A | 4/2004 |

(Continued)

OTHER PUBLICATIONS

Japanese Notice of Allowance for JP2011-511311 mailed on Oct. 2, 2012.

(Continued)

Primary Examiner — Andrew Lai
Assistant Examiner — Jamaal Henson
(74) Attorney, Agent, or Firm — Sughrue Mion, PLLC (57) ABSTRACT A radio transmission apparatus serving as a Layer-2 switch (L2SW) or a router includes a MAC frame transmission device and a radio transmission device with an adaptive modulation function, which switches over a radio transmission capacity in response to fluctuations of quality of radio transmission lines. The radio transmission device determines a modulation method based on reception power of a reception signal from a radio counterpart station, so that a PAUSE frame multiplexing the modulation method is forwarded to the MAC frame transmission device. The MAC frame transmission device detects a current radio transmission capacity from the PAUSE frame, selects QoS setting suited to the radio transmission capacity from among a plurality of QoS settings, and performs a control operation based on QoS setting with respect to a LAN signal from a user network. The radio transmission device modulates and transmits the LAN signal to the radio counterpart station.

8 Claims, 9 Drawing Sheets

(56) References Cited

FOREIGN PATENT DOCUMENTS

| | | |
|---|---|---|
| JP | 2006033713 A | 2/2006 |
| JP | 2006115156 A | 4/2006 |
| JP | 2007-251940 A | 9/2007 |
| RU | 2 280 951 C2 | 7/2006 |
| WO | 2008/077347 A1 | 7/2008 |
| WO | 2010021109 A1 | 2/2010 |

OTHER PUBLICATIONS

Russian Decision to Grant a Patent for Invention for RU2011142600 mailed on Jan. 29, 2013.
International Search Report for PCT/JP2010/003006 mailed Aug. 10, 2010.
Chinese Office Action for CN Application No. 201080017724.7 issued on Sep. 29, 2013 with English Translation.

\* cited by examiner

RADIO TRANSMISSION APPARATUS AND MAC FRAME TRANSMISSION METHOD

TECHNICAL FIELD

The present invention relates to radio transmission devices and MAC frame transmission methods.

The present application claims priority on Japanese Patent Application No. 2009-112066 filed May 1, 2009, the entire content of which is incorporated herein by reference.

BACKGROUND ART

As methods for achieving high-degree QoS (Quality of Service) functions, radio transmission devices, accompanied with adaptive modulation functions for switching over system gains and transmission capacities in response to fluctuations of quality of radio transmission lines, may employ a method for installing QoS functions in radio transmission devices and a method for combining radio transmission devices with MAC frame transmission devices serving as Layer-2 switches (L2SW).

In general, radio transmission devices serving as transmission sources conduct communications with their target transmission destinations via a plurality of other radio transmission devices. Installing QoS functions in all radio transmission devices relaying communications may cause unnecessary multiple functions and useless installation cost; hence, Qos functions are limitedly installed in specific stations needing QoS functions such as stations connected with external devices and nodes integrating a plurality of lines. Additionally, QoS functions may be installed in common radio transmission devices between relay stations that relay communications in combination with external L2SW.

Radio transmission capacities, which are narrower in frequency range than wired networks, need QoS functions to transfer MAC frames (i.e. frames recording MAC protocols) residing in radio transmission devices in accordance with priorities.

To dynamically change transmission capacities in radio transmission devices, adaptive modulation functions need to dynamically change Qos settings. In the conventional method for combining the existing L2SW with radio transmission devices, the L2SW is unable to detect fluctuations of radio transmission capacities; hence, it is impossible to perform QoS control in response to radio transmission capacities.

Next, the conventional constitution of L2SW will be described with reference to FIG. 6.

This L2SW performs interstation flow control using PAUSE frames based on IEEE802.3. According to the flow control prescribed by IEEE802.3, when a used quantity of a reception buffer exceeds a predetermined value which is determined in advance, PAUSE frames multiplying PAUSE times are transmitted to line-opposing stations to stop transmission with line-opposing stations, whereas when a used quantity of a reception buffer becomes lower than the predetermined value, PAUSE frames multiplying a PAUSE time "0" are transmitted to line-opposing stations so as to restart transmission with line-opposing stations. In this case, all frames are collectively stopped in transmitting irrespective of priorities and band controls of frames so that high-priority frames are stopped in transmitting; hence, it is difficult to secure adequate QoS control.

Next, the operation of the L2SW (A1) shown in FIG. 6 will be described with reference to a flowchart of FIG. 7.

In the L2SW (A1), a CPU (A2) extracts a PAUSE frame (A8) from a reception traffic (A7) so as to input a reception signal (A81) and forward it to a scheduler (A3) as a PAUSE detection signal (A21). According to a control flow shown in FIG. 7, the scheduler (A3) controls three priority buffers (A4, A5, A6), corresponding high/middle/low priorities, by use of priority flow control signals (A31, A32) based on the PAUSE detection signal (A21).

The flow control logic of the scheduler (A3) will be described with reference to the flowchart of FIG. 7.

Upon receiving the PAUSE detection signal (A21) from the CPU (A2) (step SA1), the scheduler (A3) of the L2SW (A1) makes a decision as to whether or not PAUSE control is currently in progress (step SA2), wherein the scheduler (A3) stops transmission using the low priority buffer (A6) if PAUSE control is not currently in progress (step SA3). Additionally, the scheduler (A3) stops transmission using the middle priority buffer (A5) while PAUSE control is in progress (step SA6).

When the scheduler (A3) receives a PAUSE release frame, or when a PAUSE control time (i.e. a transmission stop time) overpasses a prescribed time specified by a PAUSE time field of a PAUSE frame (step SA4), the scheduler (A3) releases stoppage of transmission so as to start transmission using all of the high/middle/low priority buffers (A4, A5, AG) (step SA5). Regarding this, when the above condition is not established, the scheduler (A3) continues stoppage of transmission using the corresponding priority buffer.

When the L2SW (A1) is combined with a radio transmission device having an adaptive modulation function as described above, the radio transmission device undergoes a reduction of its radio transmission capacity due to adaptive modulation. When congestion occurs in radio-direction traffic, the radio transmission device outputs a PAUSE frame to the L2SW (A1), which in turn stops transmission of the low priority buffer (A6). Upon receiving a PAUSE frame again during PAUSE control in progress, the L2SW (A1) stops transmission of the middle priority buffer (A5). Thus, it is possible to achieve flow control specified for each priority in response to the number of reception times of PAUSE frames.

Next, the conventional constitution of another L2SW will be described with reference to FIG. 8. FIG. 9 is a flowchart showing the operation of an L2SW (B1) shown in FIG. 8.

In the L2SW (B1), a shaper (B3) executes shaping on a transmission buffer (B4) based on a PAUSE detection signal (B21) from a CPU (B2) in accordance with the control flow of FIG. 9, thus adjusting a transmission rate of a transmission signal (B41).

Next, the control logic of the shaper (B3) will be described with reference to the flowchart of FIG. 9.

Upon detecting the PAUSE frame (step SB1), the shaper (B3) starts shaping to decrease a transmission rate of the transmission buffer (B4) (step SB2). Upon receiving a PAUSE release frame, or upon expiration of a prescribed time specified in a PAUSE time field of a PAUSE frame (step SB3), the shaper (B3) stops shaping (step SB4) so as to restart data transmission at the original transmission rate (step SB5). Upon receiving a PAUSE frame again during PAUSE control in progress, the shaper (B3) further decreases its transmission rate so as to receive a PAUSE release frame or repeat the above operation until the PAUSE time expires.

When the L2SW (B1) is combined with a radio transmission device having an adaptive modulation function as described above, it is possible to control a transmission rate via a PAUSE frame, wherein the radio transmission device undergoes a reduction of its radio transmission capacity due to adaptive modulation. When congestion occurs in radio-direction traffic, a PAUSE frame is transmitted to the L2SW (B1), which in turn decreases its transmission rate in response to the number of reception times of PAUSE frames; this makes it possible to prevent congestion of radio-direction traffic.

Figure 6:
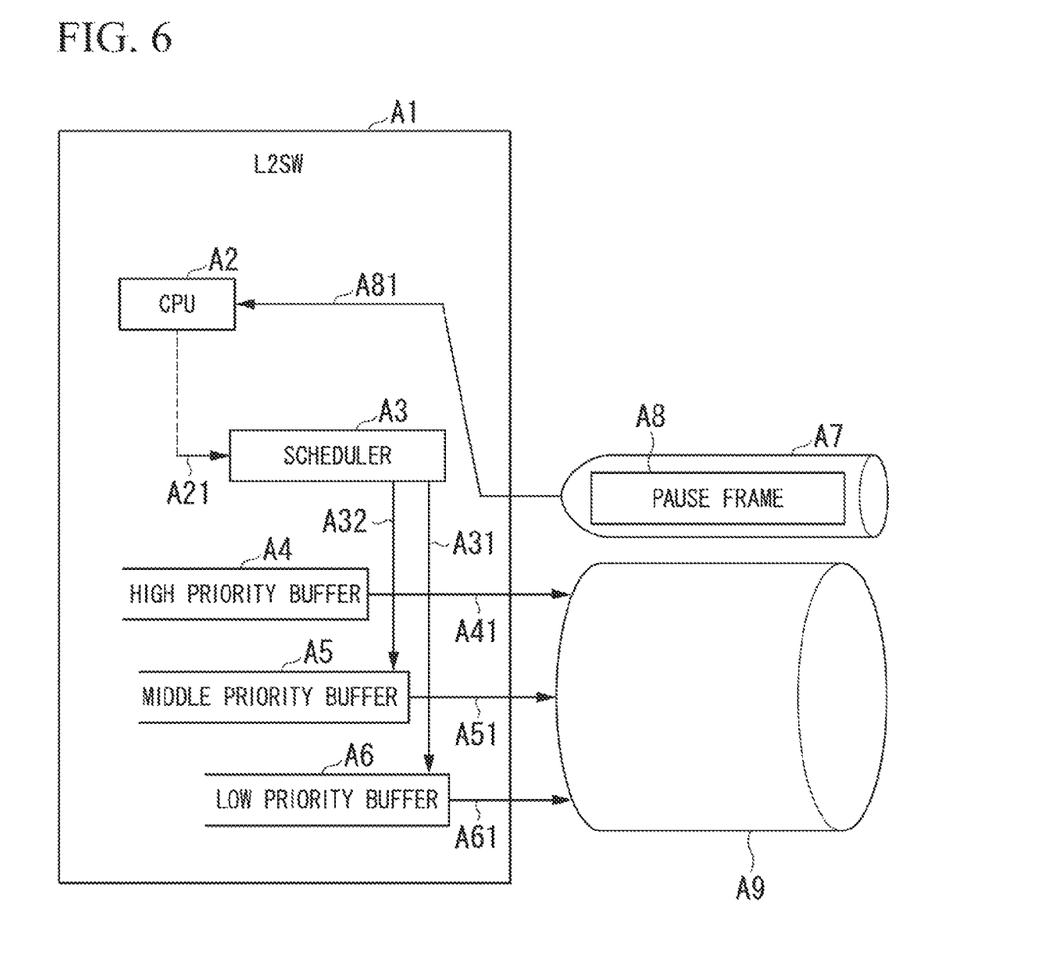
FIG. 6 A block diagram showing the constitution of the conventional L2SW.
Figure 7:
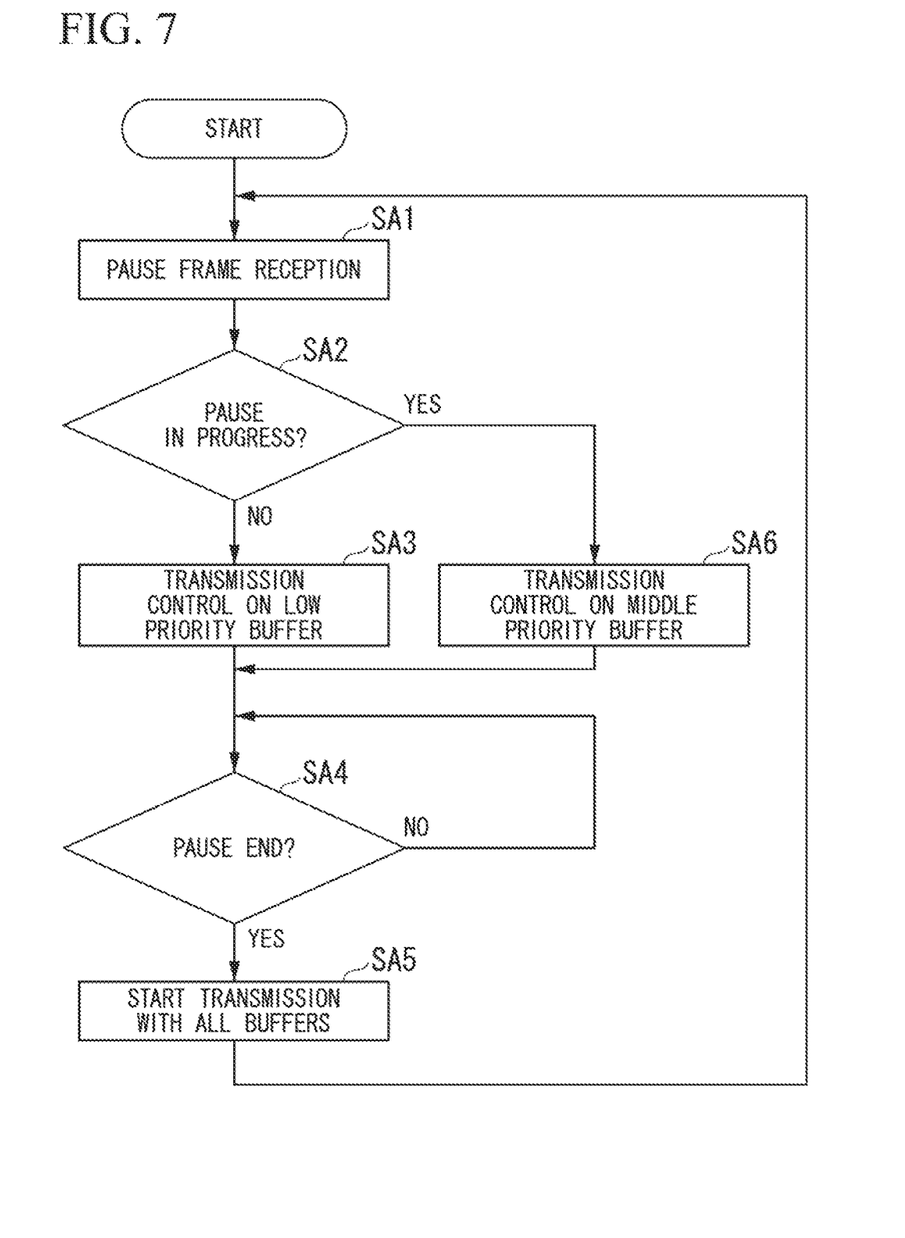
FIG. 7 A flowchart showing a flow control logic of a scheduler in the L2SW of FIG. 6
Figure 8:
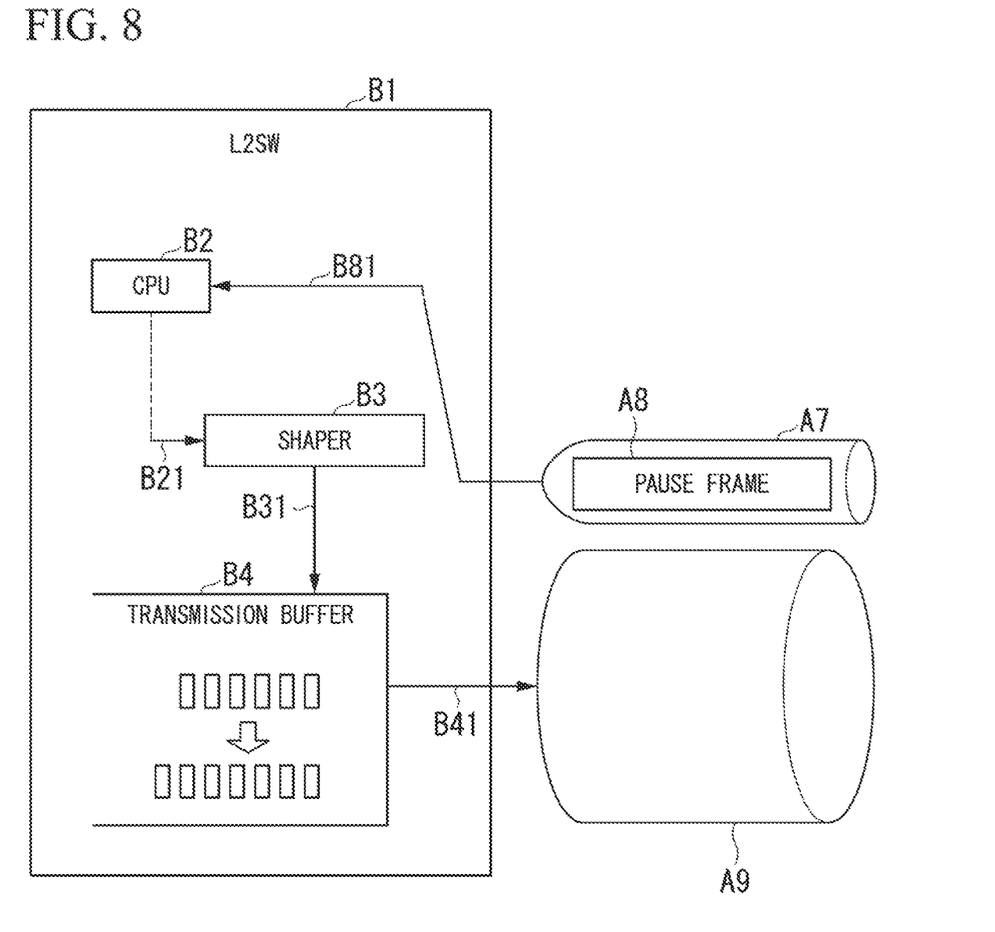
FIG. 8 A block diagram showing the constitution of another conventional L2SW.
Figure 9:
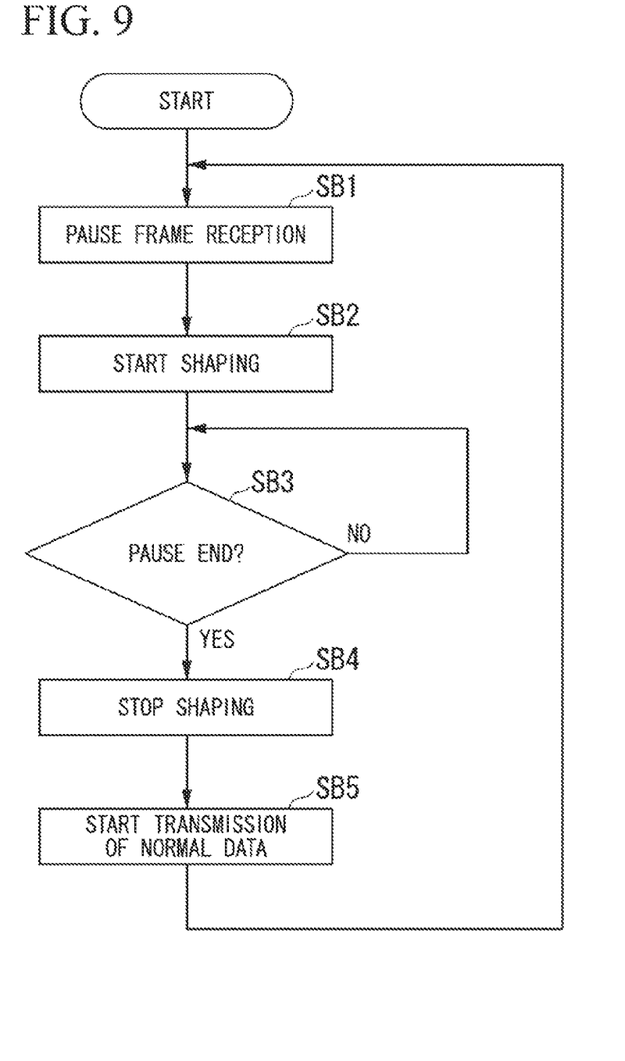
FIG. 9 A flowchart showing a control logic of a shaper in the L2SW of FIG. 8.

In the constitution shown in FIGS. 6 and 8 in which the existing L2SW is combined with a radio transmission device, the L2SW is able to detect a congested state of the radio transmission device based on the number of reception times of PAUSE frame alone; hence, the L2SW is able to notify simple information. The L2SW (A1) shown in FIG. 6 performs flow control per each priority whilst the L2SW (B1) shown in FIG. 8 updates its transmission rate; hence, they are each able to control a single item. With a simple flow control per each priority, it is impossible to implement QoS control for securing an appropriate ratio of transmission frames per each priority.

Since the existing L2SW starts its control by receiving a plurality of PAUSE frames, the L2SW involves a latency between the timing of fluctuations of radio transmission capacities and the timing of updating its transmission rate or the timing of executing flow control; this may be an obstacle in stabilizing the quality of radio transmission lines. Additionally, the existing L2SW control is unable to keep track of continuous fluctuations of radio transmission capacities.

It is necessary to install a relatively large-capacity buffer in each radio transmission device in order to continuously receive frames without exception during the latency until detection of a congested state of the L2SW switch in its radio-direction traffic. Installing a large-capacity buffer in each radio transmission device is comparable to installing a QoS function individually in each radio transmission device because it provides relatively few functions and increases installation cost; hence, it is difficult to practically achieve.

In general, the signal transmission quality of a radio communication system depends upon conditions of radio transmission lines; hence, a normal reception power during operation is set to be higher than a prescribed reception power for securing the minimum quality of communication. During normal operation, radio transmission lines may undergo a reduced resistance to fluctuations, but transmission capacities can be increased by adopting a multi-valued modulation method. Irrespective of low quality radio transmission lines, it is possible to prevent an instantaneous power failure of radio transmission lines by adopting a modulation method (with a small multi-value number) demonstrating a high resistance to fluctuations of radio transmission lines however, which in turn entails a reduction of transmission capacities. That is, when a modulation method is changed in response to conditions of radio transmission lines, it is possible to maximize radio transmission capacities, and to thereby secure minimum quantity of radio transmission capacities. This is called an adaptive modulation method, for example, which is disclosed in Patent Document 1.

In general, radio transmission capacities are smaller than frequency ranges of wired networks, and radio communication devices may accumulate frames in buffers with respect to burst signals transmitted with LANs (Local Area Networks); hence, it is necessary to perform QoS control for transmitting MAC frames in an order of higher-priority ones in radio transmission.

Patent Document 2 and Patent Document 3 disclose technologies using PAUSE frames based on IEEE802.3, wherein they perform flow control and communication band adjustment not in units of ports but per each priority.

PRIOR ART DOCUMENT

Patent Document

Patent Document 1: Japanese Patent Application Publication No. S57-159148

Patent Document 2: Japanese Patent Application Publication No. 2004-104427

Patent Document 3: Japanese Patent Application Publication No. 2006-33713

Problem to be Solved by the Invention

Due to dynamic fluctuations of radio transmission capacities owing to adaptive modulation, radio transmission devices, which are transmitting LAN signals from a user network, needs to dynamically change QoS settings, involving band limitations, band assurance, and priority control, in response to fluctuations of radio transmission capacities.

Radio LAN base stations, i.e. radio transmission devise with high-degree MAC frame transmission functions, are able to implement functions for performing QoS control when transmitting MAC frames by radio and for changing QoS settings in response to radio transmission capacities, however, it is practically difficult to implement high-degree MAC frame transmission functions with simple P-P type radio transmission devices, each of which is able to simply transmit signals to a single radio counterpart station, in consideration of functions and installation cost.

Simple P-P type radio transmission devices are able to implement high-degree QoS functions in radio transmission devices when high-degree QoS functions can be preset to external MAC frame transmission devices such as L2SW and routers. In the case of an adaptive modulation method undergoing dynamic fluctuations of radio transmission capacities, however, radio transmission devices need additional means for notifying current radio transmission capacities to MAC frame transmission devices.

Simply P-P type radio transmission devices need to newly implement protocol processing functions even when radio transmission devices and MAC frame transmission devices mutually implement specific protocols to implement functions of notifying current radio transmission capacities. This technology is practically difficult to achieve in consideration of functions and installation cost, similar to the foregoing difficulty in individually installing QoS functions.

When MAC frame transmission devices do not cope with the above protocols, radio transmission devices may transmit unnecessary MAC frames while MAC frame transmission devices may forward control frames without their destinations toward user networks, thus wasting network traffic.

The communication band adjustment method disclosed in Patent Document 1 and Patent Document 2 is invented for the purpose of solving the above problem.

This communication band adjustment method estimates a congested state of each radio transmission device in response to the number of reception times of PAUSE frames within a certain time; this involves latency while counting the number of PAUSE frames, so that this method is unable to switch over QoS settings to keep track of environments of continuously fluctuating radio transmission capacities according to the adaptive modulation method.

Since LAN signals are generally transmitted in units of frames, each receiver needs to install a reception buffer with a capacity of one or more frames, whereas the conventional method, which starts flow control after receiving a plurality of PAUSE frames, needs a certain latency before starting flow control. That is, it is necessary to provide a large-capacity reception buffer which allows each radio transmission device to receive MAC frames from each MAC frame transmission device without causing overflow.

The above solution merely refers to transmission of information in response to the number of reception times of PAUSE frames, but it is impossible to transmit information, necessary for updating a plurality of QoS settings such as band limit values and priority control logic, by way of a simple control procedure for controlling stoppage of transmission of specific-priority packets or for updating transmission rates entirely on ports.

Means for Solving the Problem

The present invention is made in consideration of the foregoing circumstances, wherein the object thereof is to provide a radio transmission apparatus and a MAC frame transmission method, which implement a function of dynamically changing radio transmission capacities during execution of adaptive modulation and which is able to dynamically change QoS settings to keep track of fluctuations of radio transmission capacities.

The present invention relates to a radio transmission apparatus connecting a radio transmission device, equipped with an adaptive modulation function for switching over its radio transmission capacity in response to fluctuations of qualities of radio transmission lines, and a MAC frame transmission device for determining and controlling communication quality. The MAC frame transmission device detects a current radio transmission capacity from a PAUSE frame forwarded from the radio transmission device with the adaptive modulation function, so that the MAC frame transmission device selects QoS setting suited to the radio transmission capacity from among a plurality of QoS settings which are set in advance, performs a control operation based on the selected QoS setting with respect to a LAN signal from a user network, and then forwards it to the radio transmission device with the adaptive modulation function. The radio transmission device with the adaptive modulation function determines a modulation method based on reception power of a reception signal transmitted from a radio counterpart station, so that the radio transmission device multiplexes the PAUSE frame with the modulation method and outputs it to the MAC frame transmission device, whilst the radio transmission device modules the LAN signal forwarded from the MAC frame transmission device and transmits it to the radio counterpart station.

The present invention relates to a MAC frame transmission method adapted to radio communication using an adaptive modulation method for switching over a radio transmission capacity in response to fluctuations of qualities of radio transmission lines. Herein, a modulation method is determined based on reception power of a reception signal transmitted from a radio counterpart station; a PAUSE frame is multiplexed with the modulation method; a current radio transmission capacity is detected from the PAUSE frame multiplexed with the modulation method; QoS setting suited to the radio transmission capacity is selected from among a plurality of QoS settings which are set in advance; a control operation based on the selected QoS setting is performed on a LAN signal from a user network; then, the LAN signal is modulated based on the modulation method and transmitted to the radio counterpart station.

Effect of the Invention

In the present invention, the radio transmission device encodes the current modulation method and multiplexes it into a PAUSE time field of a PAUSE frame, which is then forwarded to the MAC frame transmission device. This allows the MAC frame transmission device to detect the Modulation method suited to the radio transmission capacity. Additionally, the MAC frame transmission device is able to switching to the QoS setting suited to the radio transmission capacity within a plurality of QoS settings which are set in advance. The radio transmission device and the MAC frame transmission devices are independently installed in separate housings, wherein a multi-value number (i.e. a value specifying the radio transmission capacity) of the modulation method is increased so that a high-priority frame of a MAC frame is subjected to SP transmission when radio transmission lines demonstrate a good quality, whilst the multi-value number is decreased when radio transmission lines are degraded in quality due to deterioration of weather so that MAC frames regarding all priorities are subjected to WRR transmission in order to prevent the radio transmission capacity from being occupied with high-priority frames. Thus, the radio transmission device and the MAC frame transmission device are able to cooperate with each other so as to achieve QoS setting suited to the radio transmission capacity.

MODE FOR CARRYING OUT THE INVENTION

A radio transmission apparatus of the present invention includes a radio transmission device having an adaptive modulation function (hereinafter, referred to as "a radio transmission device with an adaptive modulation function") and a MAC frame transmission device. The radio transmission device with an adaptive modulation function encodes data, representing the current radio transmission capacity, so as to multiplex it with a PAUSE frame based on IEEE802.3, so that the multiplexed PAUSE frame is transmitted via the MAC frame, which is designed to handle MAC frames based on IEEE802.3, thus notifying the radio transmission capacity to the external device. Owing to adoption of adaptive modulation, the external MAC frame transmission device is involved in dynamic fluctuations of the radio transmission capacity, thus switching over QoS setting to suite the current radio transmission capacity.

Next, the radio transmission apparatus according to the preferred embodiment of the present invention will be described in detail with reference to the accompanying drawings.

Figure 1:
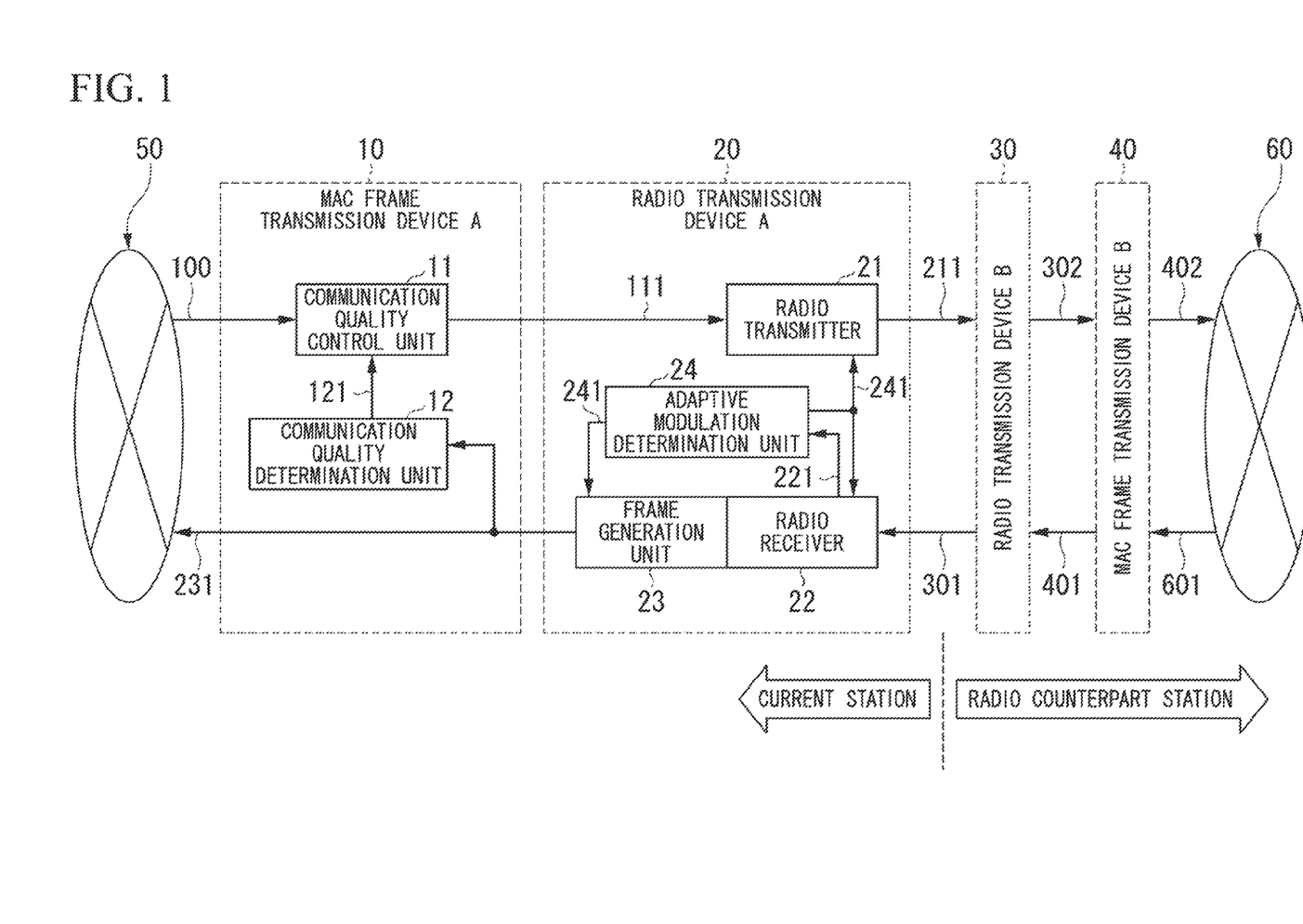
FIG. 1 A block diagram showing the overall constitution of a radio communication system adopting a radio transmission device according to a preferred embodiment of the present invention.

FIG. 1 is a block diagram showing the overall constitution of a radio communication system. Herein, the radio transmission apparatus of the present embodiment includes a MAC frame transmission device A (10) and a radio transmission device A (20). The MAC frame transmission device 10 includes a radio quality control unit 11 and a radio quality determination unit 12. The radio transmission device 20 includes a radio transmitter 21, a radio receiver 22, a frame generation unit 23, and an adaptive modulation determination unit 24.

The radio transmission apparatus of the present embodiment has the same constitution as the Layer-2 switch (L2SW) or router. That is, the MAC frame transmission device 10 incorporates a destination address and other identifiers into a MAC frame while incorporating a destination address of multiplexed data and other identifiers into a MAC frame payload, thus implementing sorting (switching) to destination ports and thereby implementing priority control, band limitation or the like. The radio transmission device 20 transmits MAC frames, which are multiplexed with radio frames, to the radio counterpart station.

The communication quality control unit 11 of the MAC frame transmission device 10 inputs a LAN signal 100 from a user network (50) and performs QoS control based on a communication quality control signal 121 from the communication quality determination unit 12, thus outputting a LAN signal 111 representing its operational result to the radio transmission device 20.

The communication quality determination unit 12 of the MAC frame transmission device 10 inputs a LAN signal 231 from the radio transmission device 20 so as to detect the current radio transmission capacity based on a PAUSE frame included in the LAN signal 231, so that the communication quality determination unit 12 selects QoS setting corresponding to the radio transmission capacity from among a plurality of QoS settings, each of which is set in advance per each radio transmission capacity, thus outputting the communication quality control signal 121 to the communication quality control unit 11.

The radio transmission unit 21 of the radio transmission device 20 inputs the LAN signal from the MAC frame transmission device 10 so as to perform modulation, specified by a modulation method notification signal 241 output from the adaptive modulation determination unit 24, thus transmitting a radio transmission signal 211 representing its operational result to a radio transmission device B (30).

The radio receiver 22 of the radio transmission device 20 demodulates a radio reception signal 301, from the radio counterpart station (i.e. a radio transmission apparatus including the radio transmission device B (30) and a MAC frame transmission device B (40)), based on the modulation method notified from the adaptive modulation determination unit 24. Specifically, the radio receiver 22 inputs the radio reception signal 301 from the radio transmission device 30 so as to demodulate the radio reception signal 301 based on the modulation method, specified by the modulation method notification signal 241 of the adaptive modulation determination unit 24, so that the frame generation unit 23 outputs the LAN signal 231 to the MAC frame transmission device 10.

The adaptive modulation determination unit 24 of the radio transmission device 20 determines the modulation method based on a reception power monitor signal 221 from the radio receiver 22 so as to forward the modulation method notification signal 241 to the radio transmitter 21, the radio receiver 22, and the frame generation unit 23. Specifically, the adaptive modulation determination unit 24 detects radio reception power from the radio transmission device 30 serving as the radio counterpart station based on the reception power monitor signal 221 from the radio receive 22, wherein the radio reception power is compared with a predetermined threshold so as to change the modulation method, so that the adaptive modulation determination unit 24 generates the modulation method notification signal 241, representing the selected modulation method, so as to forward it to the radio transmitter 21, the radio receiver 22, and the frame generation unit 23.

The communication quality determination unit 12 of the MAC frame transmission device 10 inputs the LAN signal 231 from the radio transmission device 20 so as to extract a PAUSE frame from the LAN signal 231, wherein the communication quality determination unit 12 further extracts radio transmission capacity information multiplexed with the PAUSE frame, thus detecting the current radio transmission capacity.

Based on the current radio transmission capacity, QoS setting corresponding to the current radio transmission capacity is selected from among a plurality of QoS settings (see FIG. 10), each of which is set in advance per each radio transmission capacity, and is described in the communication quality control signal 121, which is then forwarded to the communication quality control unit 11.

Figure 2:
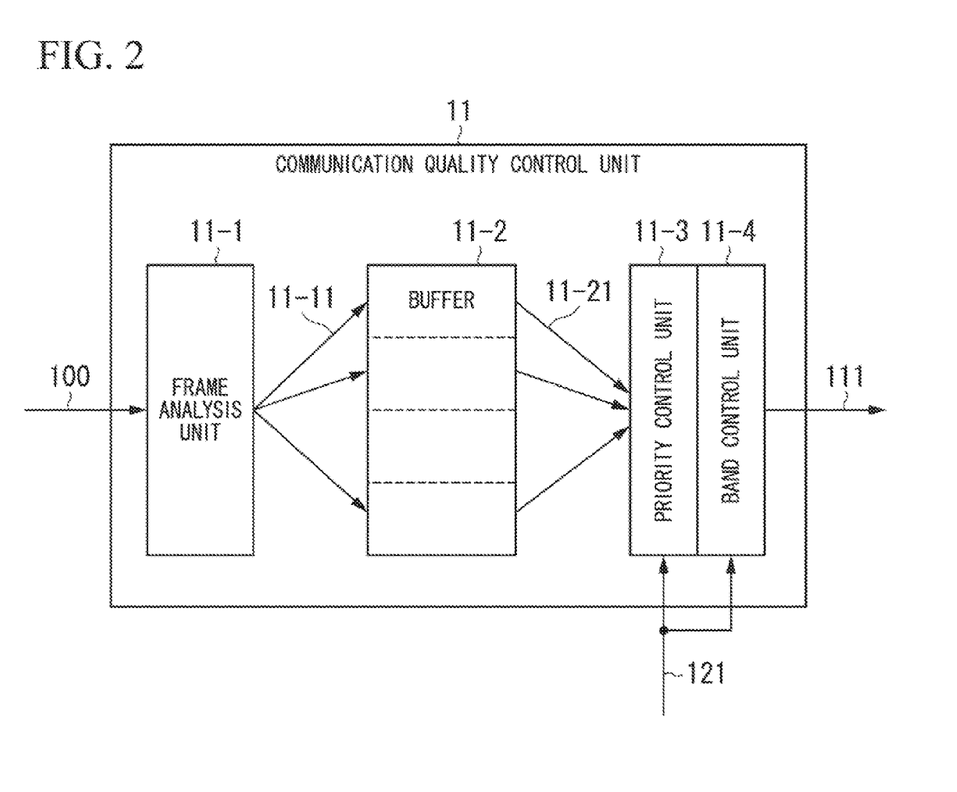
FIG. 2 A block diagram showing the internal constitution of a communication quality control unit of a MAC frame transmission device included in the radio transmission device according to the present embodiment.

FIG. 2 is a block diagram showing the internal constitution of the communication quality control unit 11 of the MAC frame transmission device 10.

In the communication quality control unit 11 shown in FIG. 2, a frame analysis unit 11-1 inputs the LAN signal 100 from the user network A (50) so as to analyze a frame forward priority based on a value of a specific field which is set in the current frame in advance, thus storing a priority transmission signal 11-11 per each priority in a buffer 11-2. A priority control unit 11-3 of the communication quality control unit 11 extracts a frame as a priority transmission signal 11-21 from the buffer 11-2 per each priority in accordance with a priority control logic specified by the priority control signal 121. A band control unit 11-4 of the communication quality control unit 11 outputs the frame as the LAN signal 111 to the radio transmission device 20 while adjusting the frame such that its frame interval will not overpass a band limit value specified by the priority control signal 121.

The radio transmitter 21 of the radio transmission device 20 modulates the LAN signal 111 from the MAC frame transmission device 10 in accordance with the modulation method specified by the modulation method notification signal 241 of the adaptive modulation determination unit 24, thus transmitting it to the radio transmission device B (30) serving as the radio counterpart station.

In the radio transmission apparatus of the present embodiment, the MAC frame transmission device 10 with rich functions for transmitting MAC frames receives a PAUSE frame multiplexed with radio transmission capacity information from the radio transmission device 20 so as to detect the current radio transmission capacity, thus switching to the corresponding QoS setting among a plurality of QoS settings, each of which is set in advance per each radio transmission capacity. This enables switching to QoS setting suited to the current radio transmission capacity.

Next, the operation of the MAC frame transmission device 10 will be described in detail. For the sake of simplification of description, four-stage priorities are set to the MAC frame transmission device 10; priority control logic employs weighted round robin (WRR) alone; a combination of two types, namely the strict priority (SP) and WRR, is employed; and two types of radio modulation methods, i.e. 64 QAM and QPSK, are employed.

The communication quality control unit 11 of the MAC frame transmission device 10 shown in FIG. 1 inputs the LAN signal 100 from the user network 50 so as to perform QoS control on the LAN signal 100 based on the communication quality control signal 121 of the communication quality determination unit 12, thus outputting the LAN signal to the radio transmission device 20.

The frame analysis unit 11-1 of the communication quality control unit 11 shown in FIG. 2 analyzes a priority of the LAN signal 100 from the user network 50 based on a priority identifier of a MAC frame prescribed by IEEE802.1P, thus storing the analysis result as the priority transmission signal 11-11 in the buffer 11-2, which is partitioned per each priority. The priority control unit 11-3 extracts the priority transmission signal 11-21 from the buffer 11-2 as one of MAC frames which are stored in a priority order according to the predetermined priority control logic. The band control unit 11-4 adjusts intervals of MAC frames such that the band of the priority transmission signal 11-21 will not overpass the predetermined frequency range, thus outputting the LAN signal 111 to the radio transmission device 20.

The communication quality determination unit 12 inputs the LAN signal 231 from the radio transmission device 20 so as to detect the radio transmission capacity from a PAUSE frame included in the LAN signal 231, so that the corresponding QoS setting is selected from among a plurality of QoS settings, each of which is set in advance per each radio transmission capacity, thus forwarding the communication control signal 121 to the communication quality control unit 11.

Figure 3:
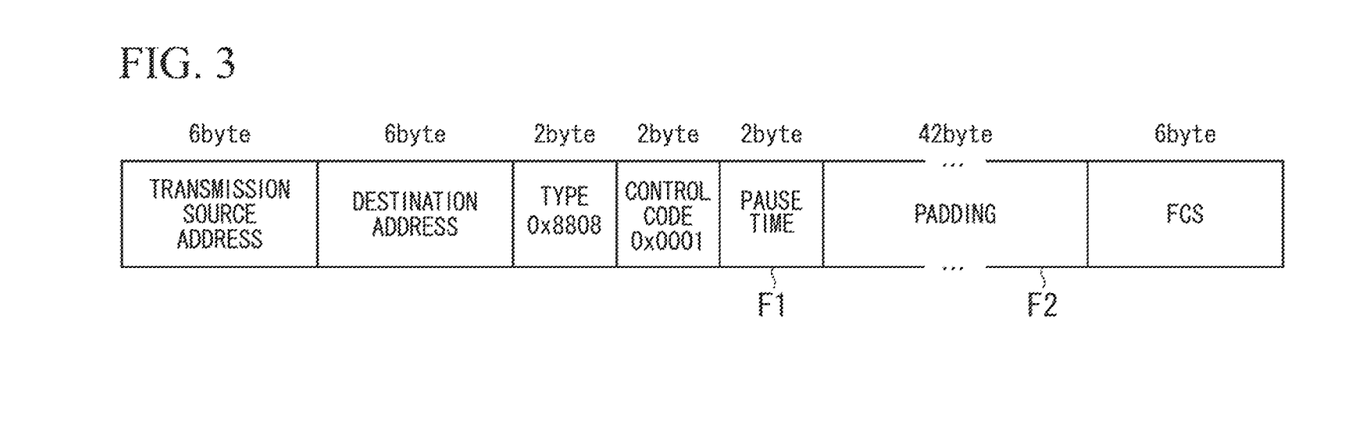
FIG. 3 An illustration of a format of a PAUSE frame prescribed by IEEE802.3.

FIG. 3 shows a format of a PAUSE frame prescribed by IEEE802.3.

The communication quality determination unit 12 extracts radio transmission capacity information from a time field F1 of a PAUSE frame shown in FIG. 3, thus determining whether to switch over QoS setting.

Figure 4:
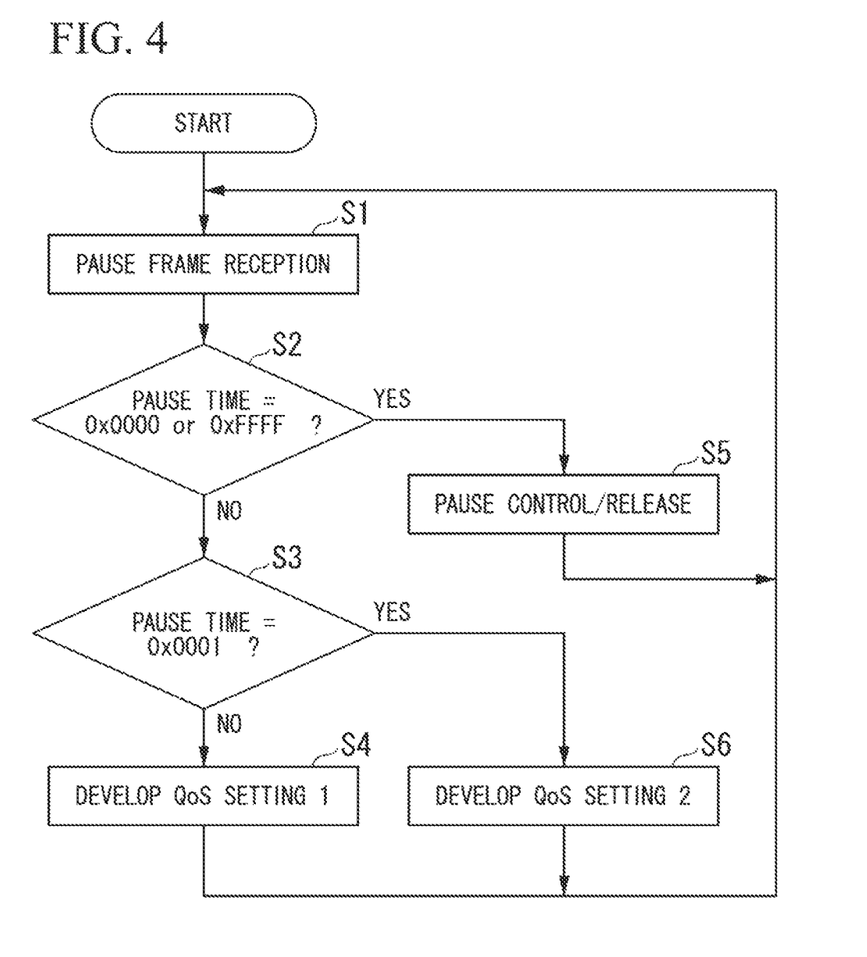
FIG. 4 A flowchart showing a QoS setting switchover process made by a communication quality determination unit of the MAC frame transmission device.
Figure 10:
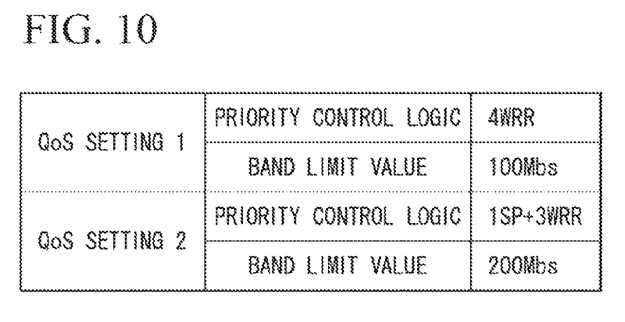
FIG. 10 An illustration of QoS setting which is set per each radio transmission capacity.

FIG. 4 is a flowchart showing a QoS setting switchover process in the communication quality determination unit 12 of the MAC frame transmission device 10. FIG. 10 shows examples of QoS settings.

Next, with reference to FIGS. 1-3 and FIG. 10, the QoS setting switchover process of the communication quality determination unit 12 will be described in accordance with the flowchart of FIG. 4.

(Step S1)

The communication quality determination unit 12 receives a PAUSE frame.

(Step S2)

The communication quality determination unit 12 makes a decision as to whether or not a value described in the time field F1 of the PAUSE frame is either "0x0000" or "0xFFFF", wherein the flow proceeds to step S5 when the decision result is "YES", whilst the flow proceeds to step S3 when the decision result is "NO".

(Step S3)

The communication quality determination unit 12 makes a decision as to whether or not a value described in the time field F1 of the PAUSE frame is "0x0001", wherein the flow proceeds to step S6 when the decision result is "YES", whilst the flow proceeds to step S4 when the decision result is "NO".

(Step S4)

The communication quality determination unit 12 selects "QoS setting 1" shown in FIG. 10, and then the flow returns to step S1. The QoS setting 1 constitute all the four-stage priorities by use of the weighted round robin (WRR) (i.e. priority control logic=4WRR), thus limiting the communication band to 100 Mbps (i.e. band limit value=100 Mbps).

(Step S5)

The communication quality determination unit 12 releases switchover of QoS setting, thereafter, normal PAUSE control is carried out.

(Step S6)

The communication quality determination unit 12 selects "QoS setting 2", and then the flow returns to step S1. The QoS setting 2 constitutes a highest priority, among four-stage priorities, by use of a strict priority (SP) while constituting three remaining priorities by use of WWR (i.e. priority control logic=1SP+3WRR), thus limiting the communication band to 200 Mbps (i.e. band limit value=200 Mbps).

By way of the above process, the communication quality determination unit 12 extracts radio transmission capacity information from a PAUSE frame output from the radio transmission device 20 so as to select desired QoS setting from among a plurality of QoS settings, thus outputting the communication quality control signal 121 to the communication quality control unit 11.

Next, the adaptive modulation method will be described.

In general, a modulation method with a higher multi-value number leads to an increase of a radio transmission capacity, while a resistance to fluctuations decreases in a radio transmission line. In contrast, a smaller multi-value number leads to a reduction of a radio transmission capacity while a resistance to fluctuations increases in a radio transmission line. That is, a radio transmission device adopting an adaptive modulation method employs a multi-valued modulation method with a good frequency availability efficiency when a sufficiently high reception power can be secured using radio transmission lines exhibiting good quality in fine weather, whilst it switches to another modulation method (with a small multi-value number) demonstrating a large difference between transmission power and minimum reception power for maintaining minimum quality (i.e. a high system gain) when radio transmission lines exhibit bad quality due to rainfall so that the multi-valued modulation method may deteriorate quality of transmission signals.

As described above, the present embodiment is able to increase the radio transmission capacity of a normal mode while securing transmission of high-priority signals irrespective of quality of radio transmission lines.

Therefore, the adaptive modulation determination unit 24 of the radio transmission device 20 selects 64 QAM as its modulation method based on the reception power monitor signal 221 from the radio receiver 22 when reception power is higher than the predetermined value, whilst the adaptive modulation determination unit 24 selects QPSK as its modulation method when reception power is lower than the predetermined value. The adaptive modulation determination unit 24 outputs the modulation method notification signal 241, representing the selected modulation method, to the radio transmitter 21, the radio receiver 22, and the frame generation unit 23.

The radio transmitter 21 of the radio transmission device 10 inputs the LAN signal 111 from the MAC frame transmission device 10 so as to perform modulation on the LAN signal 111 in accordance with the modulation method specified by the modulation method notification signal 241 of the adaptive modulation determination unit 24, thus transmitting the radio transmission signal 211 to the radio transmission device 30 serving as the radio counterpart station. Additionally, the radio receiver 22 receives the radio reception signal 301 from the radio transmission device 30 so as to demodulate the radio reception signal 301 based on the modulation method specified by the modulation method notification signal 241 of the adaptive modulation determination unit 24, thus outputting the LAN signal 231 to the MAC frame transmission device 10 via the frame generation unit 23. Furthermore, the radio receiver 22 detects reception power of the radio reception signal 301 so as to forward the reception power monitor signal 221 to the adaptive modulation determination unit 24.

The frame generation unit 23 encodes the modulation method, specified by the modulation method notification signal 241 of the adaptive modulation determination unit 24, when the modulation method is changed, wherein the PAUSE time field F1 of a PAUSE frame (see FIG. 3) is multiplexed with "0x0001" when 64 QAM is selected or "0x0002" when QPSK is selected, for example, so that a demodulation signal from the radio receiver 22 together with the multiplexed PAUSE frame is output as the LAN signal 231 to the MAC frame transmission device 10.

In the radio transmission apparatus of the present embodiment described above, the radio transmission device 20 with the adaptive modulation function encodes the currently selected modulation method and multiplexes it with the PAUSE time field F1 of a PAUSE frame, thus forwarding the multiplexed PAUSE frame to the MAC frame transmission device 10. This allows the MAC frame transmission device 10 to detect the modulation method (i.e. the radio transmission capacity) of the radio transmission device 20. Additionally, this allows the MAC frame transmission device 10, in which QoS setting per each radio transmission capacity is registered in advance, to switch to desired QoS setting suited to the radio transmission capacity detected by the communication quality determination unit 12.

Therefore, in the radio transmission apparatus of the present embodiment, the MAC frame transmission device 10 and the radio transmission device 20 with the adaptive modulation function are individually installed in separate housings, wherein a highest-priority frame among MAC frames is subjected to SP transmission by increasing a multi-value number of the modulation method (i.e. the radio transmission capacity) when radio transmission lines exhibit good quality, whilst the multi-value number of the modulation method is decreased when radio transmission lines are degraded in quality due to bad whether. This prevents the radio transmission capacity from being occupied with high-priority frames, thus achieving WRR transmission at all priorities. Additionally, the radio transmission device 20 cooperates with the MAC frame transmission device 10, thus making it possible to switch to QoS setting suited to the radio transmission capacity.

In the present embodiment, radio transmission capacity information is multiplexed with a PAUSE frame forwarded from the radio transmission device 20 to the MAC frame transmission device 10, so that the MAC frame transmission device 10 extracts the radio transmission capacity information. Compared with the conventional method in which a congested state of a radio transmission device is estimated based on the number of reception times of PAUSE frames in a certain time, the present embodiment is able to detect the radio transmission capacity in a short time, whereby the MAC frame transmission device 10 is able to switch over QoS setting to keep track of a continuously varied condition of the radio transmission capacity due to the adaptive modulation.

When the radio transmission capacity decreases due to high-speed switching of QoS setting by the MAC frame transmission device 10, it is possible to rapidly decrease the transmission rate of the MAC frame transmission device 10 so as to decrease the amount of LAN frames resided in the radio transmission device 20, whereby it is possible to prevent overflow of LAN frames even when a small-capacity reception buffer is used. In other words, it is possible to reduce the capacity (size) of a reception buffer used for transmitting LAN signals from the MAC frame transmission device 10 to the radio transmission device 20.

Since radio transmission capacity information is notified using PAUSE frames based on IEEE802.3, the present invention should be terminated by the bridge, L2SW, or router according to the prescription of IEEE802.3. Even when the radio transmission device is coupled with a MAC frame transmission device which is unable to detect radio transmission capacity information from PAUSE frames, it is possible to prevent useless consumption of network traffic since PAUSE frames multiplexed with radio transmission capacity information are not transmitted to the user network. On the other hand, when the existing radio transmission device is coupled with a MAC frame transmission device which is unable to detect radio transmission capacity information from PAUSE frames, the MAC frame transmission device may transmit PAUSE frames to the user network so as to unnecessarily waste network traffic because an individual control frame is needed to notify radio transmission capacity information.

Since the present embodiment is designed such that the MAC frame transmission device 10 and the radio transmission device 20 with an adaptive modulation function are individually installed in separate housings, it is possible to narrow down functionality of the radio transmission device 20 to a radio function, wherein it is possible to employ conventional radio transmission devices in common with respect to radio stations connectable to other radio transmission devices, nodes each integrating a plurality of lines, and relay stations for simply relaying radio signals; hence, it is possible to reduce cost of facilitating radio transmission devices and simplify maintenance works.

The radio transmission device of the present embodiment (see FIG. 1) transmits the modulation method, which is encoded and incorporated into the PAUSE time field F1 of the PAUSE frame shown in FIG. 3; but this is not a restriction. For instance, it is possible to encode and incorporate the radio transmission capacity into the PAUSE time field F1, or it is possible to multiplex radio transmission capacity information. The frame analysis unit 11-1 shown in FIG. 2 carries out analysis by use of priority identifiers of MAC frames prescribed by IEEE802.1P; but this is not a restriction. For instance, it is possible to carry out analysis by use of a ToS field of an IPv4 packet prescribed by REF791, a TC field of an IPv6 packet prescribed by RFC2470, or an MPLS-EXP field prescribed by RFC3270, each of which is multiplexed with a payload of a MAC frame.

In the radio transmission apparatus of the present embodiment, the radio transmission device 20 with an adaptive modulation function notifies radio transmission capacity information to the MAC frame transmission device 10, which in turn switches to QoS setting in response to the radio transmission capacity; but this is not a restriction. For instance, QoS setting is multiplexed with a padding field F2 of the PAUSE frame shown in FIG. 3, thus allowing the radio transmission device 20 to directly determine QoS setting of the MAC frame transmission device 10.

In the present embodiment, the MAC frame transmission device 10 employs four-stage priorities so as to determine the priority control logic by use of WRR or by use of a combination of SP and WRR, whilst the radio transmission device 20 employs two types of modulation methods, i.e. 64 QAM and QPSK, as its adaptive modulation function; but this is not a restriction. The present invention is able to appropriately increase the number of stages of priorities, the number of priority control logics, and the number of types of modulation methods; additionally, the present invention is able to easily expand QoS setting.

Figure 5:
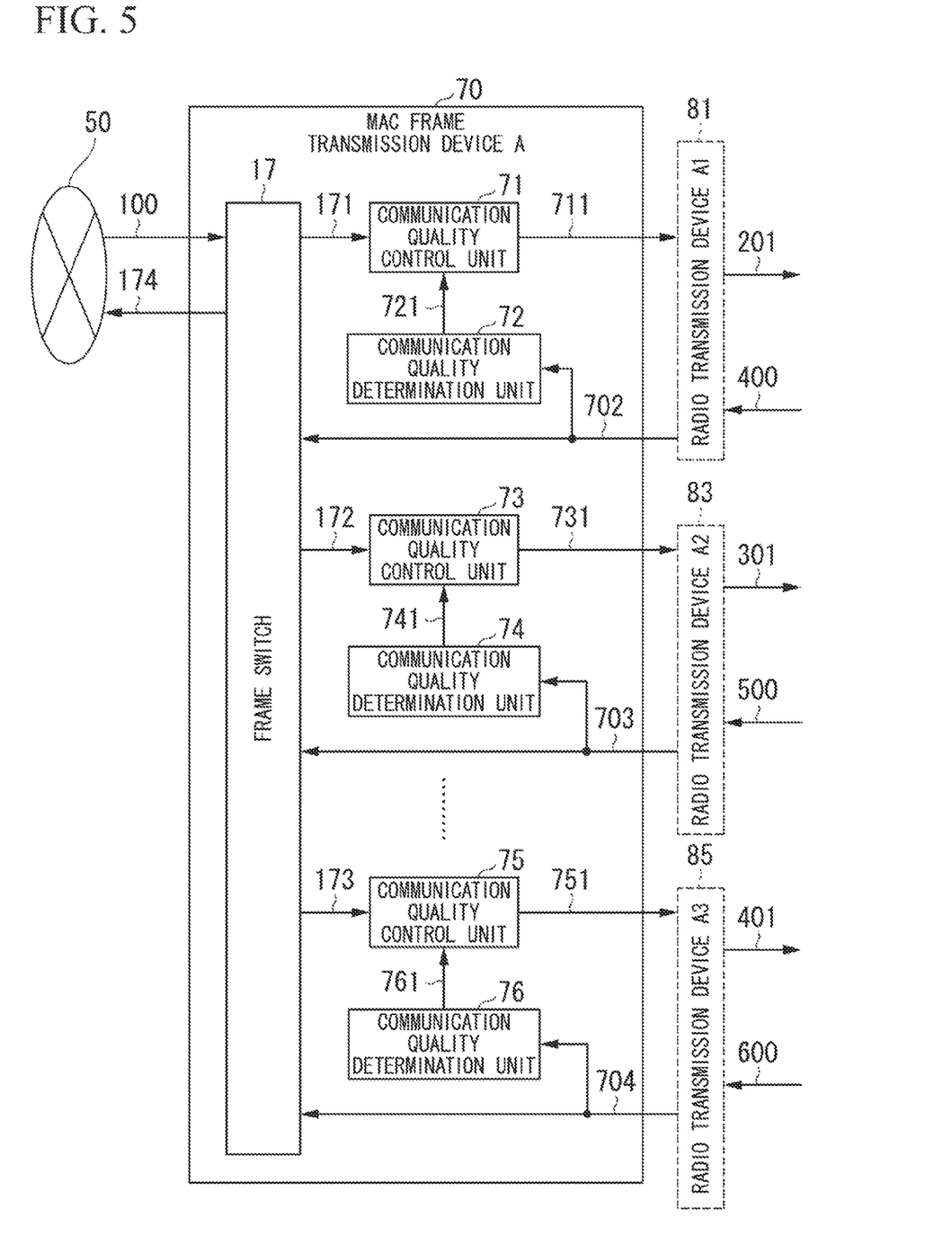
FIG. 5 A block diagram showing the constitution of a radio transmission device according to another embodiment of the present invention.

FIG. 5 is a block diagram showing the constitution of a radio transmission apparatus according to another embodiment of the present invention.

The radio transmission apparatus shown in FIG. 1 employs the configuration for connecting the MAC frame transmission device 10 and the radio transmission device 20 in a one-to-one manner, whilst the radio transmission apparatus shown in FIG. 5 employs the configuration for connecting a plurality of radio transmission devices (i.e. a radio transmission device A1 (81), a radio transmission device A2 (83), and a radio transmission device A3 (85)) to the MAC frame transmission device A (70). Herein, the radio transmission device 81 transmits a radio transmission signal 201 and receives a radio reception signal 400; the radio transmission device 83 transmits a radio transmission signal 301 and receives a radio reception signal 500; and the radio transmission device 85 transmits a radio transmission signal 401 and receives a radio reception signal 600.

The radio transmission apparatus shown in FIG. 5 combines a plurality of radio transmission lines between radio counterpart stations so as to apparently increase the overall radio transmission capacity, wherein it is possible to switch over QoS settings suited to the radio transmission capacities of the radio transmission devices 81, 83, 85 based on radio transmission capacity information extracted from PAUSE frames even when radio transmission capacities are varied due to an adaptive modulation function.

Specifically, a frame switch 17 of a MAC frame transmission device 70, included in the radio transmission apparatus shown in FIG. 5, allocates LAN signals 100, from the user network 50, in units of frames to communication quality control units 71, 73, 75 of the radio transmission devices 81, 38, 85. Communication quality determination units 72, 74, 76 detect radio transmission capacity information, multiplexed with PAUSE frames included in LAN signals 702, 703, 704 from the radio transmission devices 81, 83, 85, so as to select the corresponding QoS settings from among a plurality of QoS settings which are set in advance, thus outputting communication quality control signals 721, 741, 761 to the communication quality control units 71, 73, 75. Thus, it is possible to apply QoS settings, suited to the radio transmission capacities of the radio transmission devices 81, 83, 85.

The frame switch 17 of the MAC frame transmission device 70 integrates the LAN signals 702, 703, 704 of the radio transmission devices 81, 83, 85 into a LAN signal 174, which is transmitted to the user network 50. Thus, it is possible to increase the overall radio transmission capacity in view of the user network 50.

In this connection, an allocation logic per each frame in the frame switch 17 is executed using an IP address of an IP packet, multiplexed with a MAC address, a VLAN-ID, or a payload, or in accordance with a prescribed protocol; but this is not a restriction.

The radio transmission device and the MAC frame transmission device according to the present invention are not necessarily limited to the above embodiments; hence, various embodiments can be implemented within the scope of the appended claims.

INDUSTRIAL APPLICABILITY

The present invention is an effective technology for providing a radio communication system. In particular, the present invention is able to switch to an QoS setting suited to a radio transmission capacity in real time under the condition where the radio transmission capacity is dynamically varied due to an adaptive modulation function.

DESCRIPTION OF THE REFERENCE NUMERALS

10 MAC frame transmission device A
11 Communication quality control unit
12 Communication quality determination unit
20 Radio transmission device A
21 Radio transmitter
22 Radio receiver
23 Frame generation unit
24 Adaptive modulation determination unit
30 Radio transmission device B
40 MAC frame transmission device B
50 User network A
60 User network B

The invention claimed is:

1. A radio communication system comprising:
a radio transmission device having an adaptive modulation function for changing a radio transmission capacity due to quality variations of radio transmission lines; and
a MAC frame transmission device for determining and controlling communication quality,
wherein the MAC frame transmission device detects a current radio transmission capacity from a PAUSE frame forwarded from the radio transmission device, selects QoS setting suited to the radio transmission capacity from among a plurality of QoS settings which are set in advance, and controls transmission of a LAN signal to the radio transmission device from a user network based on the selected QoS setting, thus forwarding the LAN signal to the radio transmission device, and
wherein the radio transmission device determines a modulation method by which data is to be modulated for wireless transmission based on a reception power of a reception signal transmitted from a radio station, multiplexes the PAUSE frame with the modulation method, and outputs the PAUSE frame to the MAC frame transmission device while modulating the LAN signal forwarded from the MAC frame transmission device based on the modulation method, thus wirelessly transmitting the LAN signal to the radio station.

2. The radio communication system according to claim 1, wherein the MAC frame transmission device and the radio transmission device are combined to configure a Layer-2 switch (L2SW) or a router, which delivers to destination ports a MAC frame including a destination address and an identifier and a payload including an identifier and a destination address of multiplexed data, and wherein the MAC frame transmission device performs priority control and band limitation.

3. The radio communication system according to claim 1, wherein the radio transmission device is switched to a first modulation method with a large system gain and a small radio transmission capacity with respect to radio transmission lines with degraded quality, while the radio transmission device is switched to a second modulation method with a small system gain and a large radio transmission capacity with respect to radio transmission lines with high quality.

4. The radio communication system according to claim 1, wherein the MAC frame transmission device is coupled with a plurality of radio transmission devices with adaptive modulation functions, and wherein the MAC frame transmission device determines and controls communication quality with respect to each of the plurality of radio transmission devices.

5. A MAC frame transmission method for use in radio communication according to an adaptive modulation method for changing a radio transmission capacity due to quality variations of radio transmission lines, said MAC frame transmission method comprising:
determining a modulation method by which data is to be modulated for wireless transmission based on a reception power of a reception signal transmitted from a radio station;
multiplexing a PAUSE frame with the modulation method;
detecting a current radio transmission capacity from the PAUSE frame multiplexing the modulation method;
selecting QoS setting suited to the radio transmission capacity from among a plurality of QoS settings which are set in advance;
controlling transmission of a LAN signal from a user network to a transmission device based on the selected QoS setting; and
modulating the LAN signal based on the modulation method, thus wirelessly transmitting the LAN signal to the radio station.

6. The MAC frame transmission method according to claim 5, wherein the modulation method is switched to a first modulation method with a large system gain and a small radio transmission capacity with respect to radio transmission lines with degraded quality, the modulation method is switched to a second modulation method with a small system gain and a large radio transmission capacity with respect to radio transmission lines with high quality.

7. A radio communication system including a radio transmission unit with an adaptive modulation function for changing a radio transmission capacity due to quality variations of radio transmission lines and a MAC frame transmission unit for determining and controlling communication quality, wherein the MAC frame transmission unit detects a current radio transmission capacity from a PAUSE frame sent from the radio transmission unit, selects QoS setting suited to the radio transmission capacity from among a plurality of QoS settings which are set in advance, and controls transmission of a LAN signal from a user network to the radio transmission unit based on the selected QoS setting, thus sending the LAN signal to the radio transmission unit, and wherein the radio transmission unit determines a modulation method by which data is to be modulated for wireless transmission based on a reception power of a reception signal transmitted from a radio station, multiplexes the PAUSE frame with the modulation method, and sends the PAUSE frame to the MAC frame transmission unit while modulating the LAN signal sent from the MAC frame transmission unit based on the modulation method, thus wirelessly transmitting the LAN signal to the radio station.

8. The radio communication system according to claim 7, further including a plurality of radio transmission units with adaptive modulation functions in connection with the MAC frame transmission unit, wherein the MAC frame transmission unit switches over QoS setting suited to the radio transmission capacity with respect to each one of the radio transmission units.

* * * * *